United States Patent [19]

Miyasaka et al.

[11] Patent Number: 5,577,857
[45] Date of Patent: Nov. 26, 1996

[54] JOINT STRUCTURE FOR PILLARS AND ITS JOINING METHOD

[75] Inventors: Takaaki Miyasaka, Tokyo; Yoshitaka Ito, Ebina; Hiromichi Toshigami; Takashi Matumoto, both of Tokyo; Satoshi Yamada, Omiya; Masaaki Tada, Yamagata; Hiroshi Kasahara, Omiya, all of Japan

[73] Assignees: Daido Concrete Co., Ltd.; Shintoku Kogyo Co., Ltd., both of Tokyo; Nippon High Strength Concrete Co., Ltd., Hokkaido; Maeta Concrete Industry Ltd., Yamagata-ken, all of Japan

[21] Appl. No.: 224,573

[22] Filed: Apr. 7, 1994

[30] Foreign Application Priority Data

Dec. 27, 1993 [JP] Japan .................................. 5-333702
Dec. 27, 1993 [JP] Japan .................................. 5-333703
Dec. 27, 1993 [JP] Japan .................................. 5-333704

[51] Int. Cl.[6] .............................. E04C 3/30; F16B 2/14
[52] U.S. Cl. .................... 403/316; 403/341; 403/293; 403/371; 52/726.1; 285/421
[58] Field of Search ............................. 52/726.1, 727, 52/728, 730.1; 285/421, 415; 403/341, 316, 314, 374, 371, 368, 367

[56] References Cited

U.S. PATENT DOCUMENTS

| | | | |
|---|---|---|---|
| 969,943 | 9/1910 | Cronholm | 285/421 X |
| 3,460,300 | 8/1969 | Howlett | 52/726.1 X |
| 3,931,716 | 1/1976 | Payne . | |
| 4,159,132 | 6/1979 | Hitz | 285/421 X |
| 4,504,174 | 3/1985 | Barthel | 52/726.1 X |
| 4,684,156 | 8/1987 | Rhodes | 285/421 X |
| 4,958,961 | 9/1990 | Herbst et al. | 52/726.1 X |
| 5,012,622 | 5/1991 | Sato et al. | 52/726.1 X |
| 5,232,249 | 8/1993 | Kolvereid | 285/421 X |

FOREIGN PATENT DOCUMENTS

| | | | |
|---|---|---|---|
| 129801 | 11/1948 | Australia | 52/726.1 |
| 0521822A1 | 1/1993 | European Pat. Off. . | |
| 4009403 | 9/1991 | Germany . | |
| 59-126820A | 7/1984 | Japan . | |
| 61-204418A | 9/1986 | Japan . | |
| 3-83224 | 8/1991 | Japan . | |

*Primary Examiner*—Anthony Knight
*Attorney, Agent, or Firm*—Oliff & Berridge

[57] ABSTRACT

End plates are forcibly fixed on the longitudinal end surfaces of pillars such as foundation piles buried in the ground. The upper and lower end plates are butted, and are vertically held by a circumferential recessed groove on the inner surface of an inside ring which is divided in a plurality of parts in the circumferential direction. The inside ring is provided with a conical taper around the outside diameter surface. The conical taper is fastened by an outside ring externally fitted around the outside diameter surface of the inside ring, to join the pillars to each other. This joint structure is simple, and makes it possible to certainly join the pillars at the job site, without any welding. Moreover, there can be provided a tough joint structure against bending.

7 Claims, 14 Drawing Sheets

JOINT STRUCTURE FOR PILLARS AND ITS JOINING METHOD

BACKGROUND OF THE INVENTION

1. Field of the Invention

The present invention relates to a joint structure for pillars such as, for example, foundation piles driven into the ground.

2. Related Background Art

Foundation piles are driven while being sequentially joined to each other to be thus penetrated into the ground. The conventional joint structure for such foundation piles has been of a welded joint type. The welded joint, however, is disadvantageous for several reasons: it requires a qualified welding operator; the welding operation is affected by weather conditions; the welding strength is dependent on the skill of an operator; and the long welding time iS required in foundation piles driving, which prolongs the total working time.

To solve the above-described disadvantages, the same inventors disclosed previously a non-welded joint structure for foundation piles that are to be driven into the ground in Japanese Utility Model No. HEI 3-83224. In this joint structure, three main components are provided: circumferential grooves or projections on the pillars; a circumferentially divided cylindrical ring (hereinafter referred to "an inside ring") covers the pillars by engaging the grooves or projections; and an outer cylindrical ring (hereinafter referred to "an outside ring") set on the inside ring. The circumferential grooves (or circumferential projections) are provided around the outer peripheries of the pillars to be joined to each other in the vicinity of the end portions thereof. A multi-divided cylindrical inside ring, which has an inside diameter portion including circumferential projections (or circumferential grooves) to be engaged with the above circumferential grooves (or circumferential projections) and having an outside diameter portion including a taper, is externally fitted around the joint portion of the above pillars. An integral outside ring having an inner surface with the same taper as that of the inside ring is fitted around the outside diameter portion of the inside ring. The outside ring is pushed in the longitudinal direction of the pillars to fasten the inside ring by the effect of the above' tapers of the inside ring and the outside ring, thereby joining the pillars to each other.

The above-described disadvantages of the welded joint have been solved by the development of a new joint, which utilizes in place of the welded joint the combination of the inside ring and the outside ring, that is, the so-called non-welded joint structure.

The above-described joint structure can be used with pillars having outside diameters ranging from 300 to 1200 mm. It has advantages in simplifying the assembly because no site welding is required, and standardized dimensions and accuracies of the joint permit easy manufacturing the joint with constant quality. The joint structure eliminates the difficulty in the works as in the welded joint, and enhances the reliability of the joint; accordingly, it has been favorably used.

In the above-described technique, however, it is necessary to enhance the accuracy in fitting between a plurality of the circumferential grooves (or circumferential projections) provided around the outside diameter portions of the pillars and a plurality of the circumferential projections (or circumferential grooves) provided around the inside diameter portion of the inside ring.

Incidentally, examination of past earthquake damage indicates that the liquefaction of the ground is generated in the stratum of a sand layer. When the ground is liquefied, the ground is often moved laterally at the position where the liquefaction is generated. The lateral movement of the ground occasionally extends several meters. When the ground is greatly moved laterally, the underground structure may float or sink, also it may be damaged or destroyed. The foundation piles, of course, may be broken in the ground.

The above-described non-welded joint structure is of a rigid joint type, that is, not of a flexible joint type, so that it cannot flexibly absorb the sideward movement of the ground due to an earthquake. Accordingly, pillars having the non-welded joint structure such as foundation piles buried in the ground may be possibly destroyed by earthquakes. Slender pillars such as foundation piles have a small bending toughness. The sideward movement of the ground is extremely dangerous for this structure. It is reported that pillars such as foundation piles buried in the ground are destroyed by the movement of the ground in an amount of several decimeters. This agrees well with the actual damage. Accordingly, there are has been strong demands for a new type joint structure for pillars, which is different from the conventional rigid joint type, and which is capable of being greatly deformed to follow the deformation of the ground.

SUMMARY OF THE INVENTION

An object of the present invention is to simplify the above-described non-welded joint structure for foundation piles, and to provide a joint structure with enhanced rigidity and to further increase the reliability of engaging the taper surfaces provided on an inside ring and an outside ring.

Another object of the present invention is to provide a joint structure for large diameter pillars.

A further object of the present invention is to improve the above-described non-welded joint structure for foundation piles, and to provide a joint structure that has sufficient toughness that will not be broken when the stratum is moved laterally and thereby withstand ground that may be liquefied by earthquakes.

An additional object of the present invention is to provide a joining method wherein a hoop tension applied to an outside ring is made constant.

To achieve the above objects, according to the present invention, there is provided a joint structure for pillars, including: disk-like or ring-like end plates that are forcibly fixed on end surfaces of the pillars to be joined together. The end plates are provided with truncated conical seats around the outer peripheral corner portions of the end plates on a non-joint side. A cylindrical inside ring is divided into a plurality of parts along the circumference. The inside ring includes an inner surface having a circumferential recessed groove with side walls to abut the seats of the end plates axially butted together. An outside diameter surface of the inside ring has a conical taper tilted in the axial direction of the pillars. The inside ring is intended to be fitted around the outer periphery of the butted portions of the end plates. An outside ring includes an inner surface having a conical taper to be fitted around the outside diameter surface of the inside ring for fastening the inside ring.

For large size pillars, preferably, the inside ring has a plurality of conical tapers on the outer surface. The outside ring has a plurality of outside ring parts that are each intended to be fitted around the plurality of the conical tapers of the inside ring.

Preferably, the inner surface taper of the outside ring has a gradient ranging from 1/10 to 1/30. Moreover, by forming circumferential projections having sawtooth sections to be meshed with each other on the outer surface of the outside ring and the inner surface of the inside ring, the positional deviation generated between the inside ring and the outside ring may be prevented in earthquakes.

Another feature of the present invention lies in the joint structure having flexural toughness. There are some types of joint structures to embody the features. Namely, there is provided a first joint structure in which the inside ring and the outside ring are externally fitted around the end surfaces of the two pillars and are fastened by the effect of tapers, wherein an elastic body is interposed between the butted end plates. The inside ring is divided into a plurality of parts in the circumferential direction and includes an inner surface having a circumferential recessed groove with a bottom surface to abut the outer peripheries of the end plates and with side walls to abut the seats. An outside diameter portion of the inside ring has a conical taper tilted along the axial direction of the pillars. The inside ring is intended to be fitted around the outer periphery of the butted portions of the end plates. In this case, an interval between the side walls of the circumferential recessed groove is preferably set to be larger than the sum of the thicknesses of the butted end plates and the elastic body interposed between the end plates.

There is provided a second joint structure in which the inside ring and the outside ring are externally fitted around the end surfaces of the two pillars and are fastened by the effect of tapers. Elastic bodies are interposed between the outside truncated conical surface of the end plates and the corresponding parts in the circumferential recessed groove of the inside ring. The inside ring is divided into a plurality of parts in the circumferential direction and includes an inner surface having a circumferential recessed groove with a bottom surface that abuts the outer peripheries of the end plates and with side walls having clearance with the seats. An outside diameter portion of the inside ring has a conical taper tilted along the axial direction of the pillars. The inside ring is intended to be fitted around the outer periphery of the butted portions of the end plates. In this case, an interval between the side walls of the circumferential recessed groove is preferably set to be larger than the sum of the thicknesses of the butted end plates and the elastic bodies interposed inside the recessed groove of the inside ring.

There also is provided a third joint structure comprising both an elastic body interposed between the butted end plates and elastic bodies located on the outside conical surfaces of the end plates. In this case, an interval between the side walls of the circumferential recessed groove is preferably set to be larger than the total sum of the thicknesses of the butted end plates, the elastic body interposed between the end plates, and the elastic bodies located on the outside conical surfaces of the end plates.

The elastic body is composed of one or more materials selected from a group consisting of natural rubber, synthetic rubber, plate spring, high pressure fluid spring, and easy-to-deform metal.

Moreover, the elastic body is wholly formed into a ring shape, and may be formed into a planar, circular, rectangular or rhombic shape in the radial section.

Recessed grooves on which the elastic body is seated are preferably provided on the surfaces of the upper and lower end plates to abut on the elastic body. This permits easy positioning during construction, and water-tightness.

As another structure for obtaining the bending toughness, the inside ring includes an inner surface having a circumferential recessed groove with a bottom surface that abuts the outer peripheries of the end plates and has an interval between the side walls larger than the total thickness of the seats. This forms a clearance in the longitudinal direction of the pillars between the end plates and the recessed groove.

According to the present invention, a method of joining pillars together includes joining a cylindrical inside ring divided into a plurality of parts in the circumferential direction and having an outer surface having a conical taper in the longitudinal direction of end plates of the pillars, the inside ring being engaged with the pillars, to an outside ring having a conical taper externally fitted around the inside ring. The length of the conical taper of the inside ring is longer than the length of the taper of the outside ring. The joining is performed by applying a specified axial thrust to the outside ring.

DETAILED DESCRIPTION OF THE PREFERRED EMBODIMENTS

Figure 1:
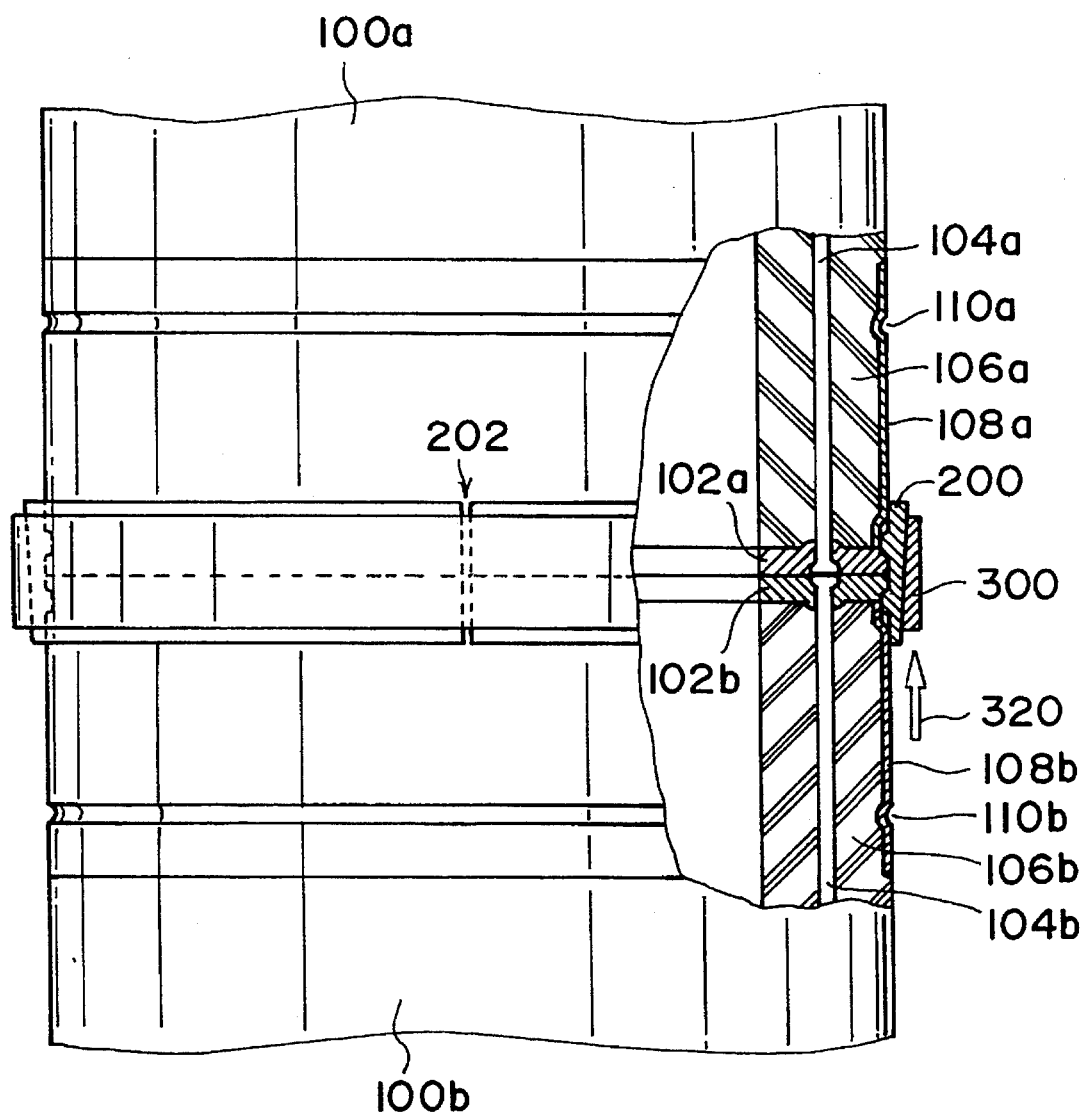
FIG. 1 is a side view, partly in cross section, of a joint structure for pillars according to an embodiment of the present invention.
Figure 2:
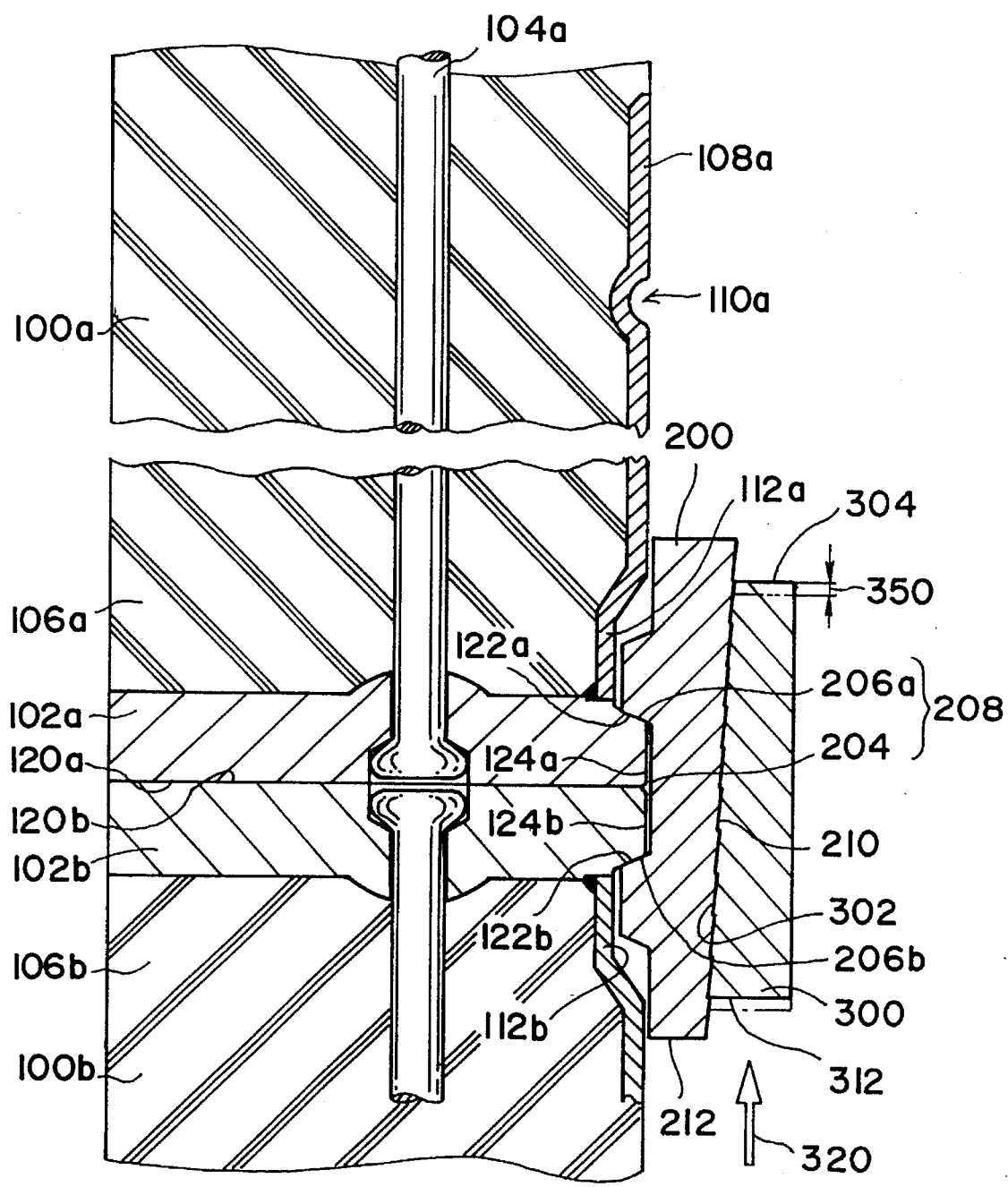
FIG. 2 is a fragmentary vertical sectional view of a joint structure for pillars according to an embodiment of the present invention.

FIG. 1 is a partial cross-sectional side view of a joint structure for pillars to which the present invention is applied. FIG. 2 is a fragmentary enlarged view of FIG. 1. An upper pillar 100a is formed of a precast concrete or PC in which one end of a steel bar 104a for prestressed concrete is fixed on an end plate 102a at the lower end of the upper pillar 100a. A pre-stress is applied to the concrete 106a. The end plate 102a is provided with a truncated conical seat 122a around an outer periphery on a counter-butted surface. The truncated conical seat 122a has a surface finished with high accuracy. The conical seat 122a abuts a side surface 206a of a circumferential recessed groove 208 having a truncated conical section provided on the inner surface of an inside ring 200 to be externally fitted around the seat 122a. An end plate 102b at an upper end of a lower pillar 100b contacts the end plate 102a at the lower end of the pillar 100a by way of abutment surfaces 120a and 120b. The end plate 102b is provided with a truncated conical seat 122b around an outer periphery on a counter-butted surface. The truncated conical seat 122b abuts a side surface 206b of the circumferential recessed groove 208 of the inside ring 200.

The inside ring 200 has a cylindrical shape and is divided into a plurality of parts in the circumferential direction. The inside ring 200 is externally fitted around the end plates 102a and 102b. The side surfaces 206a and 206b of the circumferential recessed groove 208 have truncated conical sections that abut the end plates 102a and 102b to draw the end plates 102a and 102b together, thus crimping them. As a result, the pillars 100a and 100b are joined to each other. Accordingly, the circumferential recessed groove 208 has the side surfaces 206a and 206b finished with high accuracy so as to abut the truncated conical seats 122a and 122b with certainty. An outside diameter surface 210 of the inside ring 200 is provided with a conical taper having a gradient in the longitudinal direction of the pillar.

An outside ring 300 has an integral cylindrical shape having a conical taper along an inner periphery that is externally fitted around the conical taper on the outside diameter surface of the inside ring 200. By moving the outside ring 300 with a specified thrust applied in the longitudinal direction of the pillar, as shown by the arrow 320, the inside ring 200 is fastened by the engagement between the conical taper on the outside diameter surface of the inside ring 200 and the conical taper on the inner diameter surface of the outside ring 300. The side surfaces 206a and 206b of the circumferential recessed groove 208 on the inner surface of the inside ring 200 abut the truncated conical seats 122a and 122b of the end plates 102a and 102b to crimp the end plates 102a and 102b to integrally join the pillars 100a and 100b together.

The dimensions of the inside ring 200 are determined such that a plurality of mating portions 202 divided in the circumferential direction are slightly spaced apart from each other when the pillars 100a and 100b are perfectly joined to each other, as shown in FIG. 1.

In this embodiment, the gradient of the cylinder taper for fitting the inside ring 200 to the outside ring 300 is taken as 1/20. On the contact surfaces of the taper 210 on the outer surface of the inside ring 200 and the taper 302 on the inner surface of the outside ring 300, there are formed circumferential sawtooth projections to be meshed with each other. The circumferential projections serve to prevent the movement of the tapers and loosening of the rings.

Covering metal cylinders 108a and 108b are mounted on the end plates 102a and 102b with reduced portions 112a and 112b formed in the vicinity of the end plates 102a and 102b, respectively. Circumferential groove shaped reinforcing anchors 110a and 110b bite the concrete 106a and 106b, respectively.

In this embodiment, only the truncated conical seats on the end plates of the pillars are finished and others parts are arbitrarily formed into shapes not interfering with each other, and the outside ring is fastened with a specified axial thrust. This simplifies the joint for pillars, which enables the stable joining of pillars even at the job site. In addition, a coating of an inhibitor may be applied on the fitting surfaces of the joint for preventing the joint portion in the ground from being damaged due to rust. As a result, the durability of the joint can be enhanced.

Figure 3:
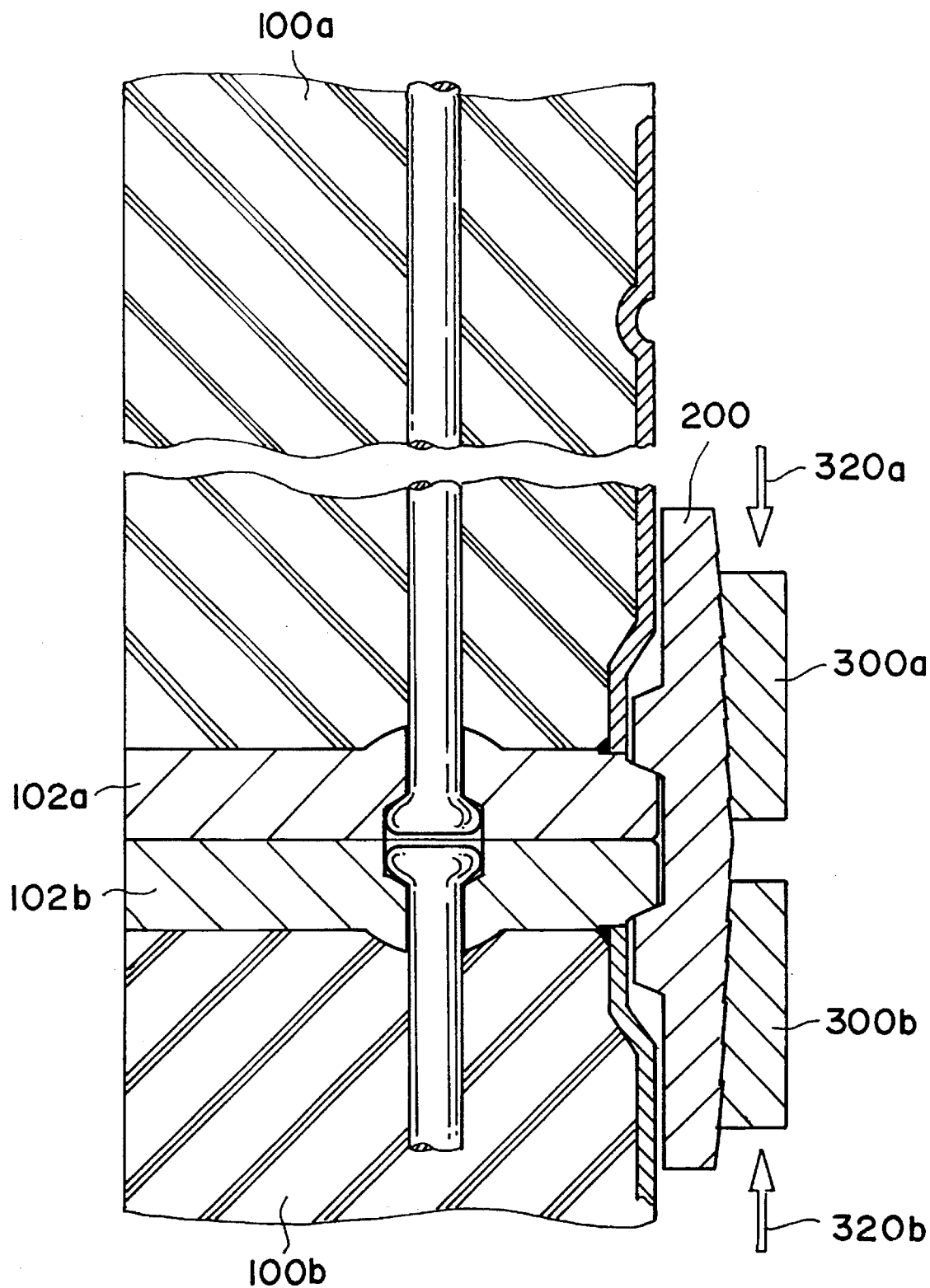
FIG. 3 is a fragmentary vertical view of a joint structure for pillars according to an embodiment of the present invention.

FIG. 3 shows an embodiment applicable for large diameter pillars. A conical taper portion formed on the outside diameter surface of an inside ring 200 has a double-structure with two tapers opposed to each other with respect to the center of the width in the longitudinal direction of the pillar. Two outside rings 300a and 300b are provided.

The joint structure of FIG. 3 includes the divided type cylindrical inside ring 200 having a plurality of axial conical taper surfaces on the outer surface, and the fastening outside rings 306a and 300b to be externally fitted around the outer surface tapers of the inside ring 200. The outer surface tapers of the inside ring 200 are tilted reversely to each other in the axial direction, and are identical to each other in shape. The outside rings 300a and 300b, which are also identical to each other in shape, are externally fitted around the inside ring 200 in reverse orientation to each other, and are simultaneously fastened with an equal force. Accordingly, this joint structure is suitable in equalizing the fastening force, in unifying the kinds of manufacturing parts, and in improving the interchangeability.

For pillars having an outside diameter of 600 mm, the projecting height of the outside ring from the surface of the pillars is about 22 mm. For pillars having an outside diameter of 1000 mm, the projecting height becomes about 45 mm. For this reason, the outside ring is divided into the two outside rings 300a and 300b, so that the projecting height of the outside ring becomes about 22 mm. Moreover, since the outside rings are fitted in the vertical direction, the workability can be improved.

In assembly of the joint structure shown in FIG. 3, the outside rings 300a and 300b are simultaneously drawn in the direction of the arrows 320a and 320b, to perform the joining while keeping the balance without any additional reaction force. Accordingly, the outside rings 300a and 300b can fasten the inside ring 200 with an equal fastening force. With this joint structure, the weight of the member is suitably adjusted, and the workability can be enhanced. Moreover, this joint structure is suitable in scattering and equalizing the fastening force, in unifying the kinds of manufacturing parts, and in improving the interchangeability. In particular, this joint structure greatly contributes to the extension in the range of the actual applications of the joints for large diameter pillars.

FIGS. 9(a)–(d) illustrate the sectional profiles of embodiments of the inside rings 200. The side surfaces 206a and 206b of the circumferential recessed groove 208 on the inner surface of the inside ring 200 abut the end plates 102a and 102b, respectively, to act as transmission surfaces for the force joining the pillars 100a and 100b. The other surfaces of the inside ring 200 on the inner surface side do not contact the end plates 102a and 102b or the reinforcing plates 108a and 108b. The above non-contact portions are not required to be finished. Accordingly, the inside ring 200 is easily machined, and has a simple shape. Moreover, the end plate surfaces of the pillars 100a and 100b are closely contacted with each other, to eliminate the loss in the transmission of the crimping force.

Figure 9:
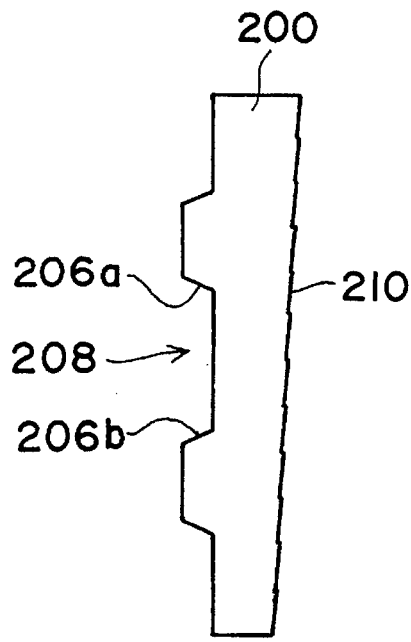
FIGS. 9(a)–(d) show sectional profiles of examples of inside rings according to an embodiment of the present invention.
Figure 9:
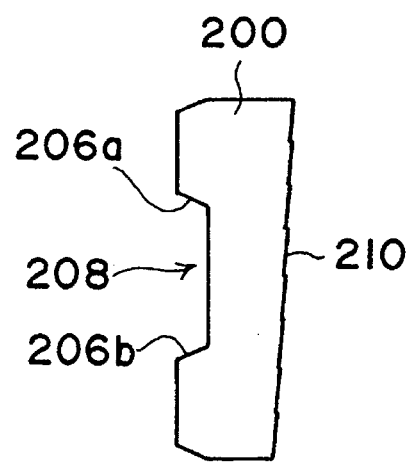
Figure 9:
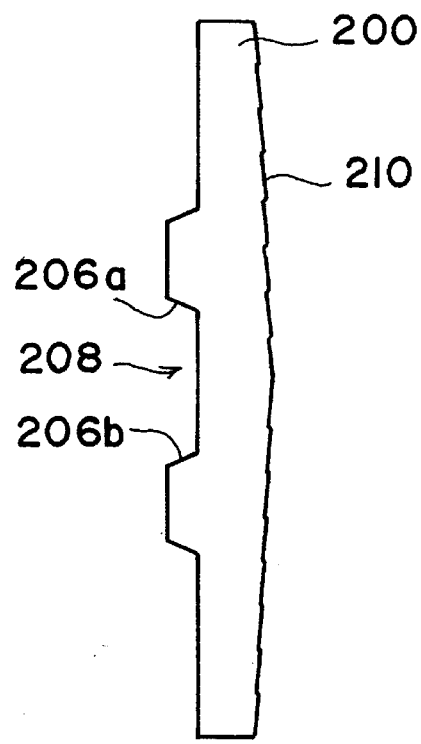
Figure 9:
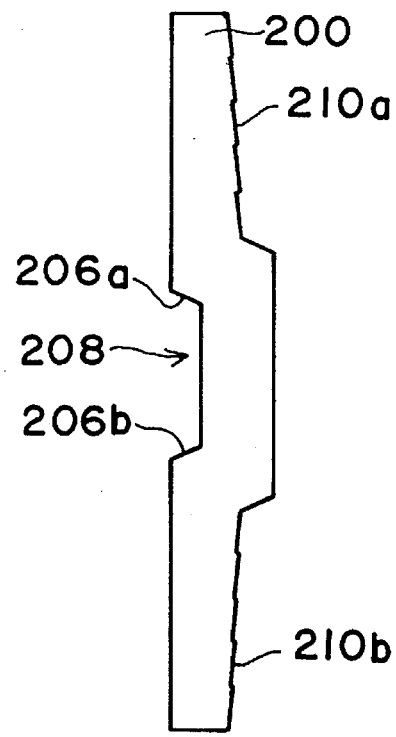

The inside ring and outside ring can be easily formed in shapes having the sectional profiles shown in FIG. 9 by hot-rolling of steel products, without any complicated cutting.

Figure 10:
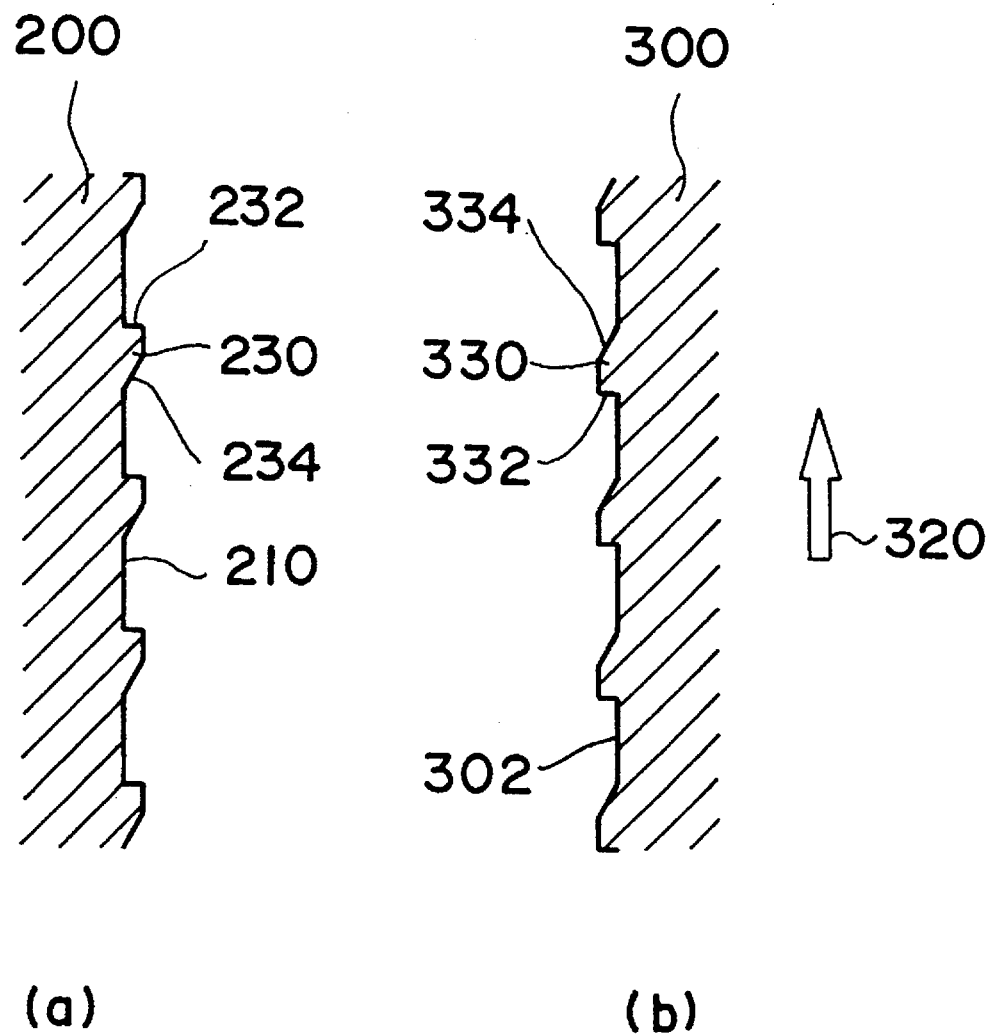
FIGS. 10(a)–(b) are fragmentary vertical sectional views showing inside rings and outside rings according to the present invention.

The conical taper surface 210 on the outer surface of the inside ring and the conical taper surface 302 on the inner surface of the outside ring may be provided with the circumferential irregularities having sawtooth sections, as shown in FIGS. 10(a) and (b). FIG. 10(a) is an enlarged vertical view showing a portion of the outside diameter surface of the inside ring 200. FIG. 10(b) is an enlarged vertical view showing the portion of the inside diameter surface of the outside ring 300. A slope surface 234 and an upright surface 232 of the circumferential projection 230 of the inside ring 200 are opposite a slope surface 334 and an upright surface 332 of the circumferential projection 330 of the outside ring 300, respectively. When the outside diameter surface 210 of the inside ring 200 is contacted with the inner peripheral surface 302 of the outside ring 300 and the outside ring 300 is moved in the direction of the arrow 320 to fasten the inside ring 200 by the engagement between the conical tapers, the sawtooth projections mesh with each other to prevent the outside ring 300 from being moved in the direction where the fastening of the taper surfaces is loosened (i.e., opposite the direction of the arrow 320). Accordingly, the need of spot welding is eliminated after the inside ring and the outside ring are assembled. The sawtooth projections may have a pitch of 3 mm and the height of about 0.7 mm.

Next, an embodiment of joint structure having flexural toughness for pillars will be described.

Figure 17:
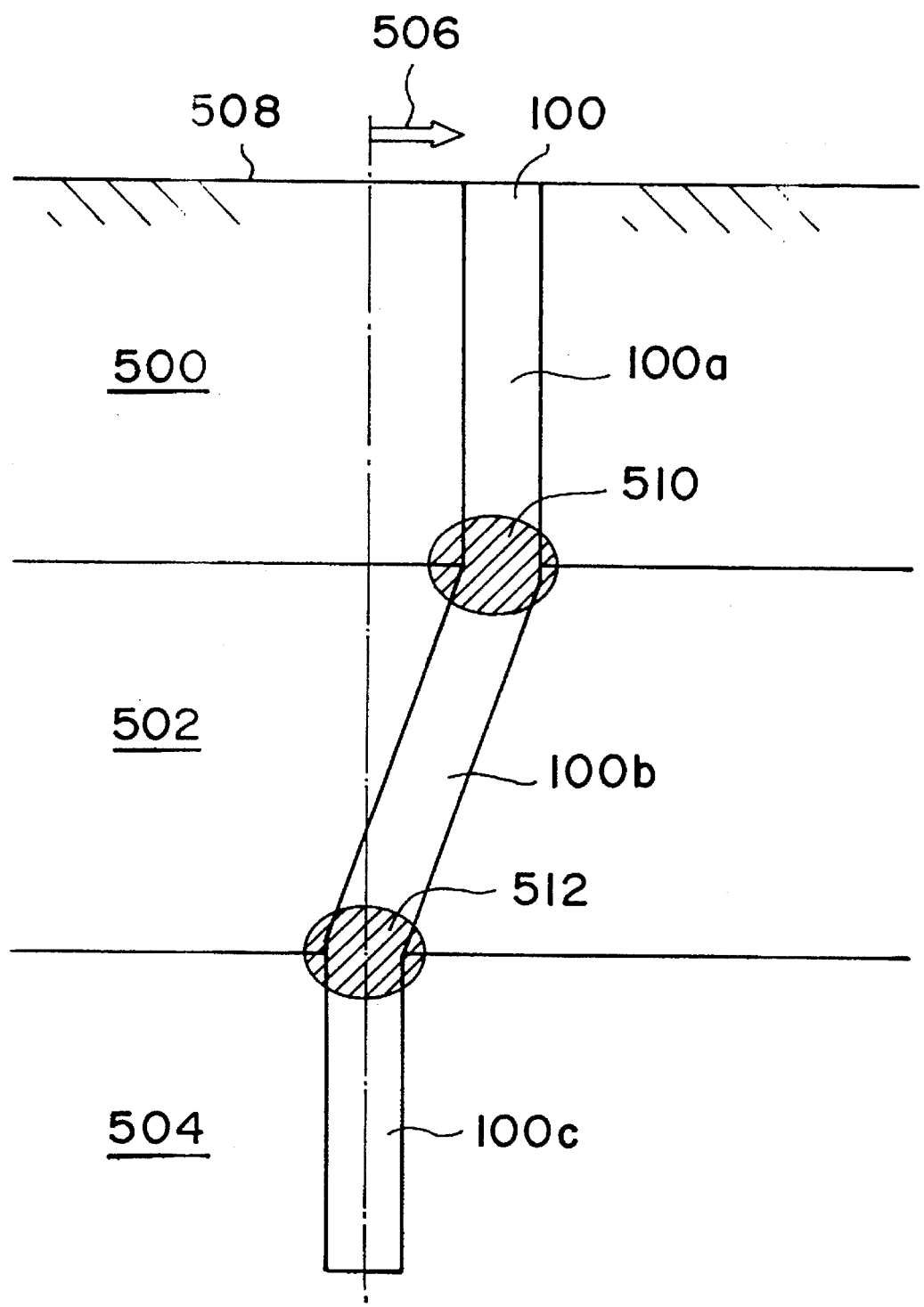
FIG. 17 is an explanatory view of lateral ground movement.

As shown in FIG. 17, when a pillar 100 driven in ground liquefied by earthquake encounters lateral movement 506, portions 510 and 512 of the pillar are destroyed at the interfaces between a liquefied layer 502 and upper and lower non-liquefied layers 500 and 504. This phenomenon is often observed in the ground which is liquefied by earthquake. The lateral movement of the ground has been apparent for ten years, and the decisive countermeasure has not been developed in terms of earthquake-proof design. This is under research at the present time as the most important theme.

Figure 4:
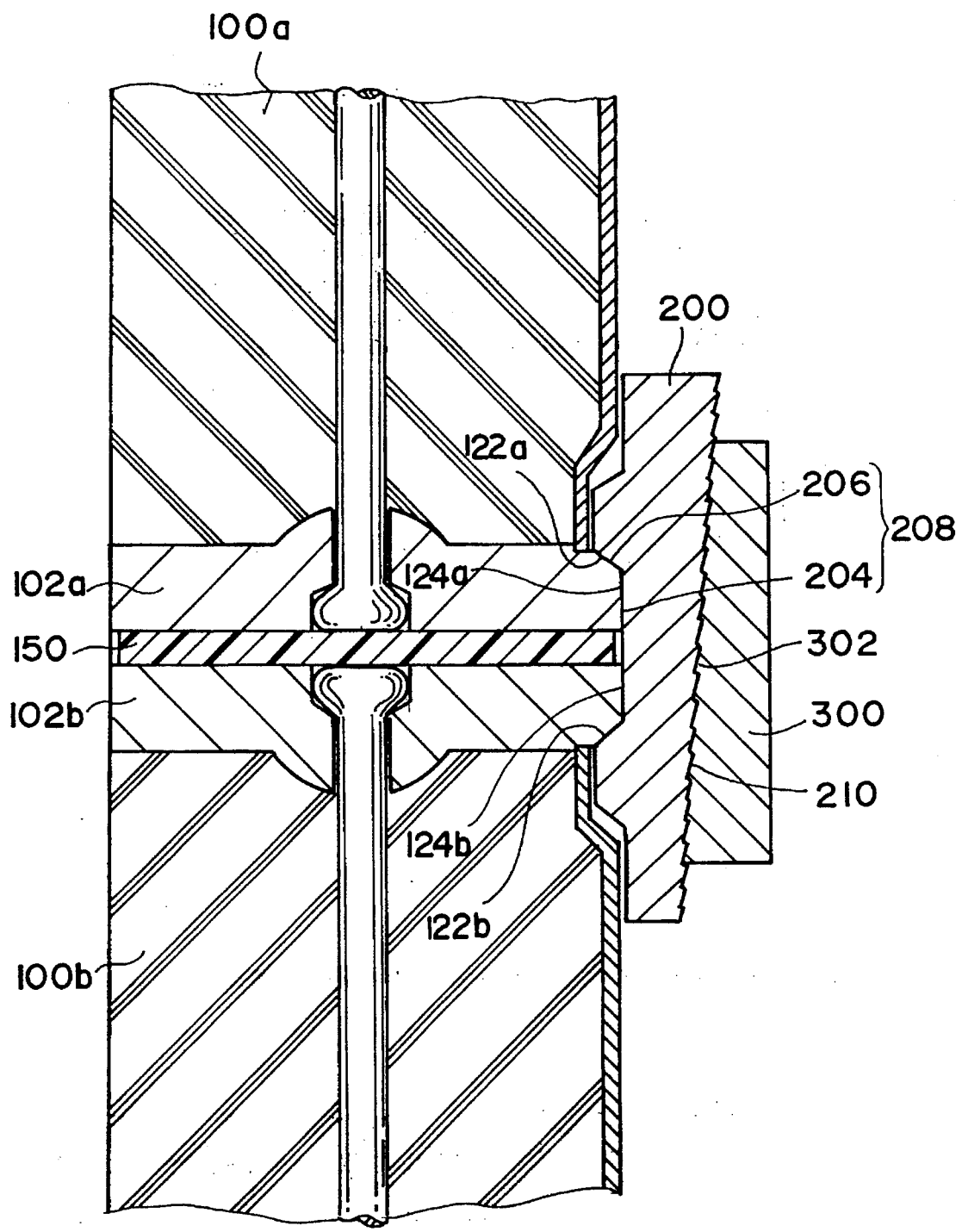
FIG. 4 is a fragmentary vertical sectional view of a joint structure for pillars according to an embodiment of the present invention.

In an embodiment shown in FIG. 4, an elastic body 150 is held between the end plates 102a and 102b. In a circumferential recessed groove 208 on the inner surface of an inside ring 200, a side wall 206 and a bottom surface 204 abut the end plates 102a and 102b, respectively. The width (in the axial direction of the pillar) of the side wall 206 of the circumferential recessed groove 208 is equal to or greater than the sum of the dimensions of the elastic body 150 and the end plates 102a and 102b.

According to the present invention, only the outer peripheral surfaces of the end plates of the pillars and the recessed portion of the inside ring that abuts the outer peripheral surfaces of the end plates is slightly larger than the sum of the thicknesses of the end plates are finished. The other parts may be formed into shapes not interfering with each other.

Accordingly, an earthquake-proof joint structure for piles can be produced that is simplified and enables a stable fitting with a specified pressure even at the job site.

The samples of the elastic bodies used for the above structure of the present invention include an elastic material such as natural rubber, synthetic rubber, elastomer or plate spring; an elastic structure such as high pressure pneumatic or fluid spring; an easy-to-deform material such as lead, tin, antimony or alloys thereof; and easy-to-deform material such as metal or plastic, or structure when a large load is applied.

As the above elastic material, a chloroprene rubber with high attenuation is suitably used. The chloroprene rubber is obtained by substituting the $CH_3$ radical by the —Cl radical in a polyisoprene rubber, which is suitably used as an earthquake-proof material being excellent in the aging resistance.

The elastic body may be formed into a disk or ring shape to abut the end surface of the pillar with any radial cross-section such as a planar, circular, rectangular, or rhombic shape.

Recessed grooves on which the elastic body is seated may be provided by suitably machining the butted surfaces of the end plates to abut on the elastic body according to the shape of the elastic body. In this case, the elastic body can be easily positioned, and also can serve as a sealing material.

An embodiment shown in FIG. 5 will be described below. Only outer peripheral surfaces 124a and 124b of end plates 102a and 102b are finished with high accuracy. Similarly, only a bottom surface 204 of a circumferential recessed groove 208 on the inner surface of an inside ring 200 is finished with high accuracy, which is externally fitted around the outer peripheral surfaces 124a and 124b abuts the end plates 102a and 102b. The side walls 206a and 206b are separated from truncated conical seats 122a and 122b of the end plates 102a and 102b. In the clearances between the side walls and the conical seats, elastic bodies may be inserted.

Figure 5:
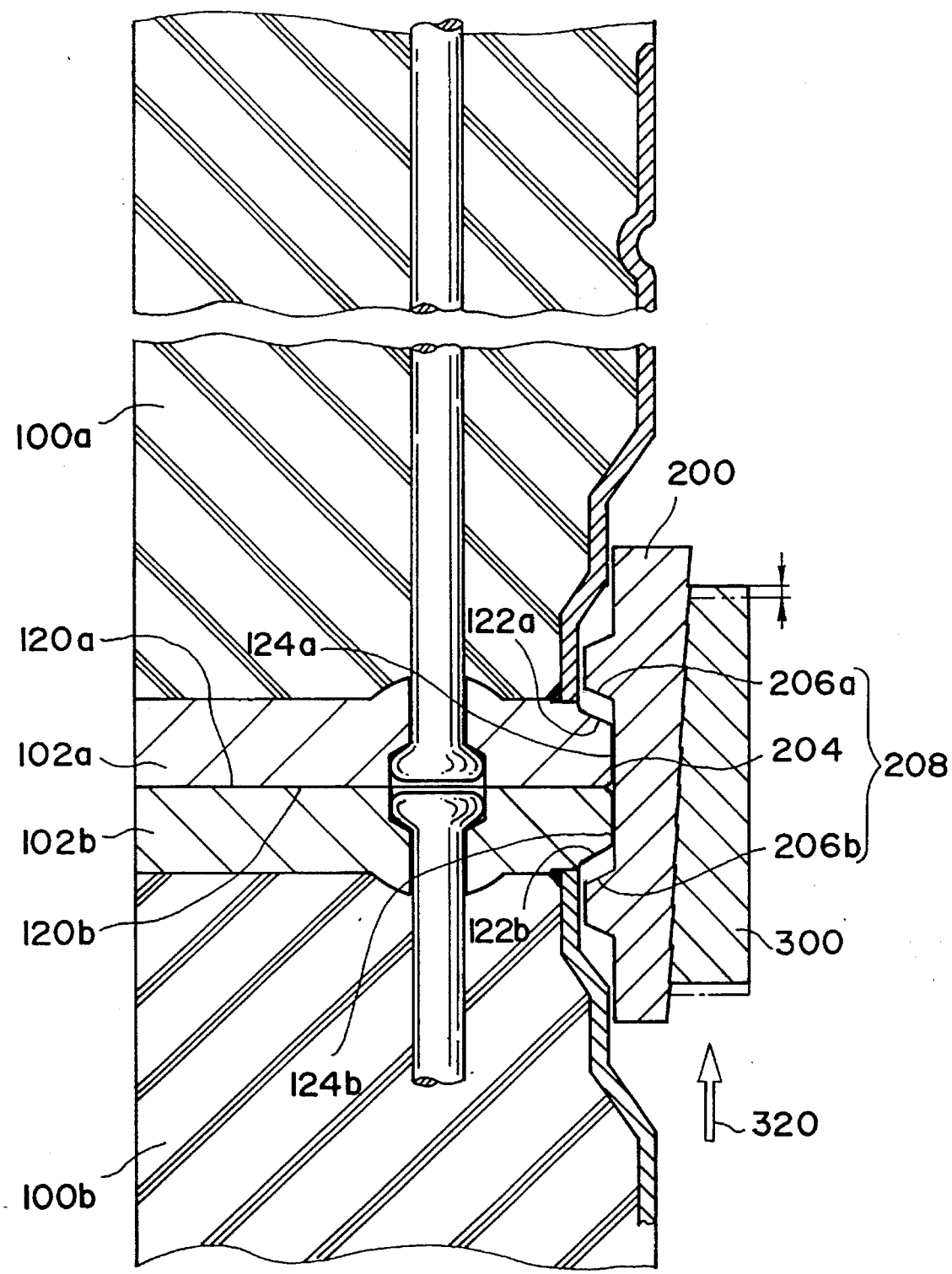
FIG. 5 is a fragmentary vertical sectional view of a joint structure for pillars according to an embodiment of the present invention.

The joint structure shown in FIG. 5 is not a perfect rigid joint type, wherein the upper and lower pillars are relatively movable. In this embodiment, the outer peripheral surfaces of the end plates abut the inner surface of the inside ring. The other parts of the pillars are not contacted with the inside ring and are not required to be finished. The inside ring 200 and the outside ring 300 can be formed into specified sectional shapes by hot rolling, without any complicated machining, thereby lowering the manufacturing cost.

Preferably, the seats 122a and 122b on the outer peripheral surfaces of the end plates 102a and 102b are formed into smoothly projecting tapers, and the side walls 206a and 206b of the circumferential recessed groove 208 of the inside ring 200 are also formed into the tapers parallel to those of the seats 122a and 122b. When an external force is applied to the pillars 100a and 100b from the side, peripheral abutment surfaces increase the resistance against the external force and cause the outside ring to be gradually elastically relaxed, thereby enabling the pillars 100a and 100b to be included each other.

Since the pillars 100a and 100b are vertically driven in the ground, the load of the upper pillar 102a is applied on the lower pillar 102b. When the pillars 102a and 102b are joined to each other, the bottom portion 204 of the circumferential recessed groove 208 on the inner surface of the inside ring 200 abuts the end plates 102a and 102b which are closely contacted with each other, to thus restrict and join the end plates 102a and 102b together.

The clearance between the recessed groove and the end plates is preferably filled with an elastic material such as rubber. And the elastic material may be equally divided in the vertical direction or may be offset on one side in the groove. The elastic material may be deformed while resisting against the external force.

Figure 6:
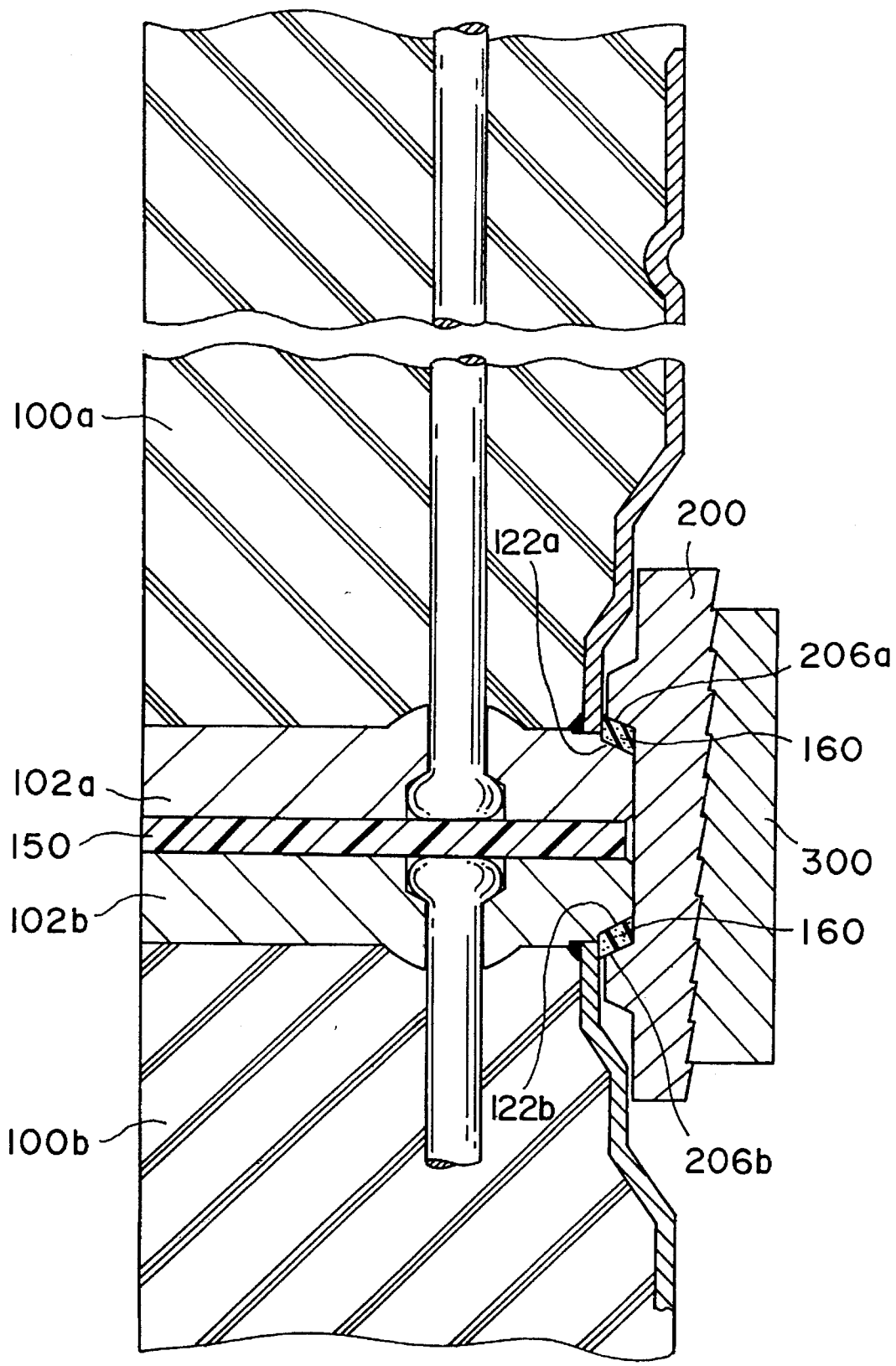
FIG. 6 is a vertical sectional view of a joint structure for pillars according to an embodiment of the present invention.

FIG. 6 illustrates an embodiment provided with an elastic body 150 held between two end plates 102*a* and 102*b* as well as elastic bodies 160 filled in the clearance between the side walls 206*a* and 206*b* of the recessed groove 208 on the inner surface of the inside ring 200 and the truncated conical seats 122*a* and 122*b* of the end plates 102*a* and 102*b*. The embodiment shown in FIG. 6 has greater toughness than those shown in FIGS. 4 and 5.

Figure 7:
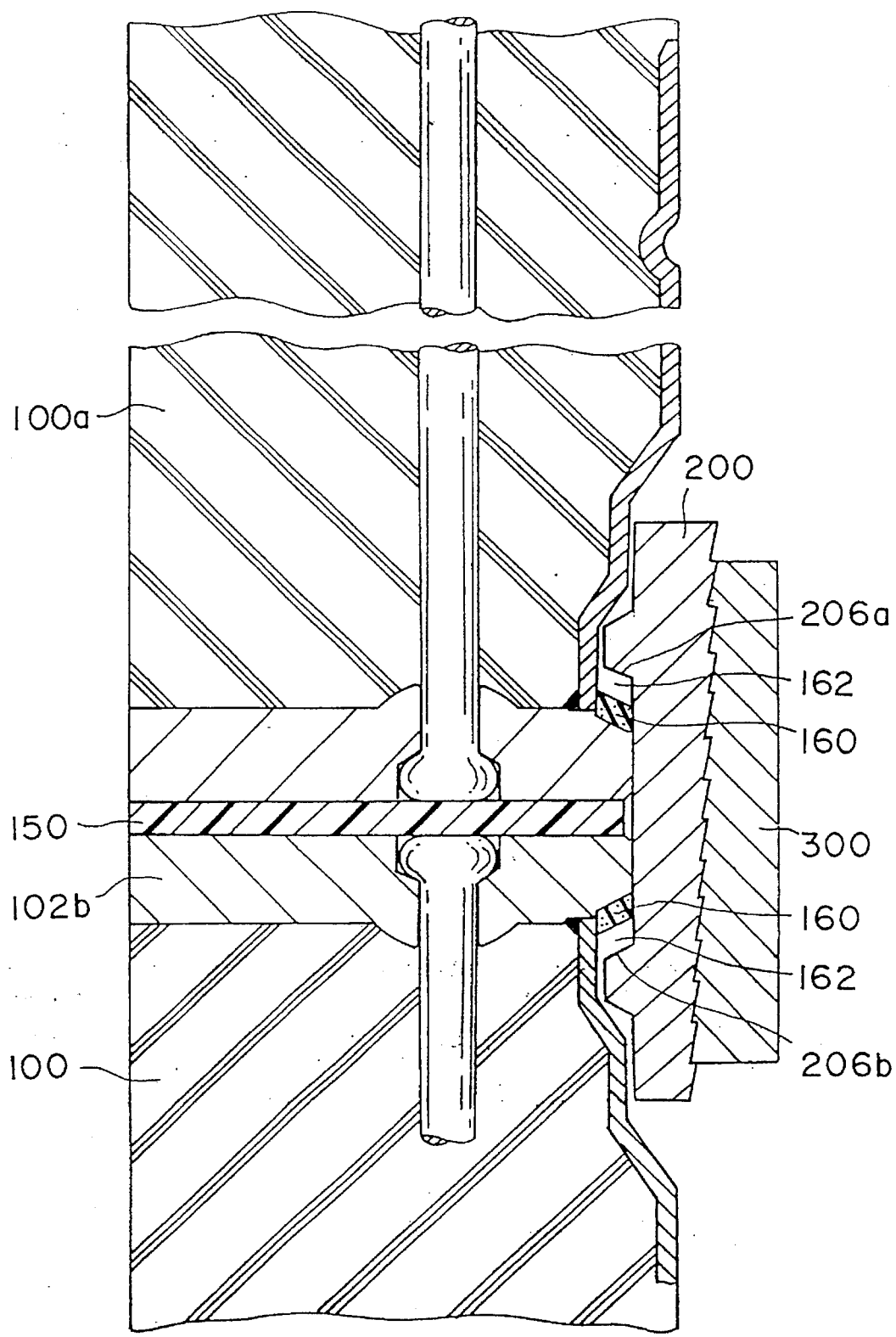
FIG. 7 is a vertical sectional view of a joint structure for pillars according to an embodiment of the present invention.

Further, FIG. 7 shows an embodiment that includes an elastic body 150 held between the two end plates 102*a* and 102*b* as well as elastic bodies 160 filled in the clearance between the side walls 206*a* and 206*b* of the recessed groove 208 on the inner surface of the inside ring 200 and the truncated conical seats 122*a* and 122*b* of the end plates 102*a* and 102*b*. In this embodiment, the interval between the two walls 206*a* and 206*b* (i.e. the width of the recessed groove on the inner surface of the inside ring 200) is larger than the total sum of the thickness of the end plates 102*a*, 102*b* and the elastic body 150 and elastic bodies 160.

The structure in FIG. 7 provided with excess clearances 162 may ensure maximum flexural toughness.

In the joint structure shown in any one of FIGS. 4, 5, 6 and 7 having the above-described construction, when the ground is liquefied by earthquake and is moved laterally, the joint portion can be deformed while resisting against the lateral movement. In this deformation, the outside ring is elastically relaxed, to permit the relative bending of the axes of the upper and lower pillars. The joints having the above construction are provided at a plurality of positions along the pillar, which makes it possible to cope with a large deformation. In addition, the upper and lower pillars are restricted by the circumference recessed groove of the inside ring, and are not released. The joint structure is not a rigid joint type, and acts to assist the bending toughness of the pillars without destruction as in the conventional pillars, and to follow the sideward movement of the ground while keeping the function against the axial force, that is, the supporting force.

Since the lateral movement of the ground is generated at an interface between the liquefied layer and non-liquefied layer, it is possible to estimate the location of the interface prior to the construction on the basis of the groundwater level or the N-value distribution of a standard penetration test. Accordingly, the joint structure of the present invention is designed to be positioned at the interface for absorbing the energy of earthquake by deformation of the joint portion. Moreover, using a plurality of joint structures, it is possible to follow a large deformation. This makes it possible to prevent the damage of pillars by earthquake, and hence to ensure safety.

The joint structure for pillars shown in FIGS. 4, 5, 6 and 7 is a flexurally tough earthquake-proof structure, and is almost the same in cost as the conventional rigid type joint structure. Thus, the above-described pillars are excellent in economy and practical use.

Figure 8:
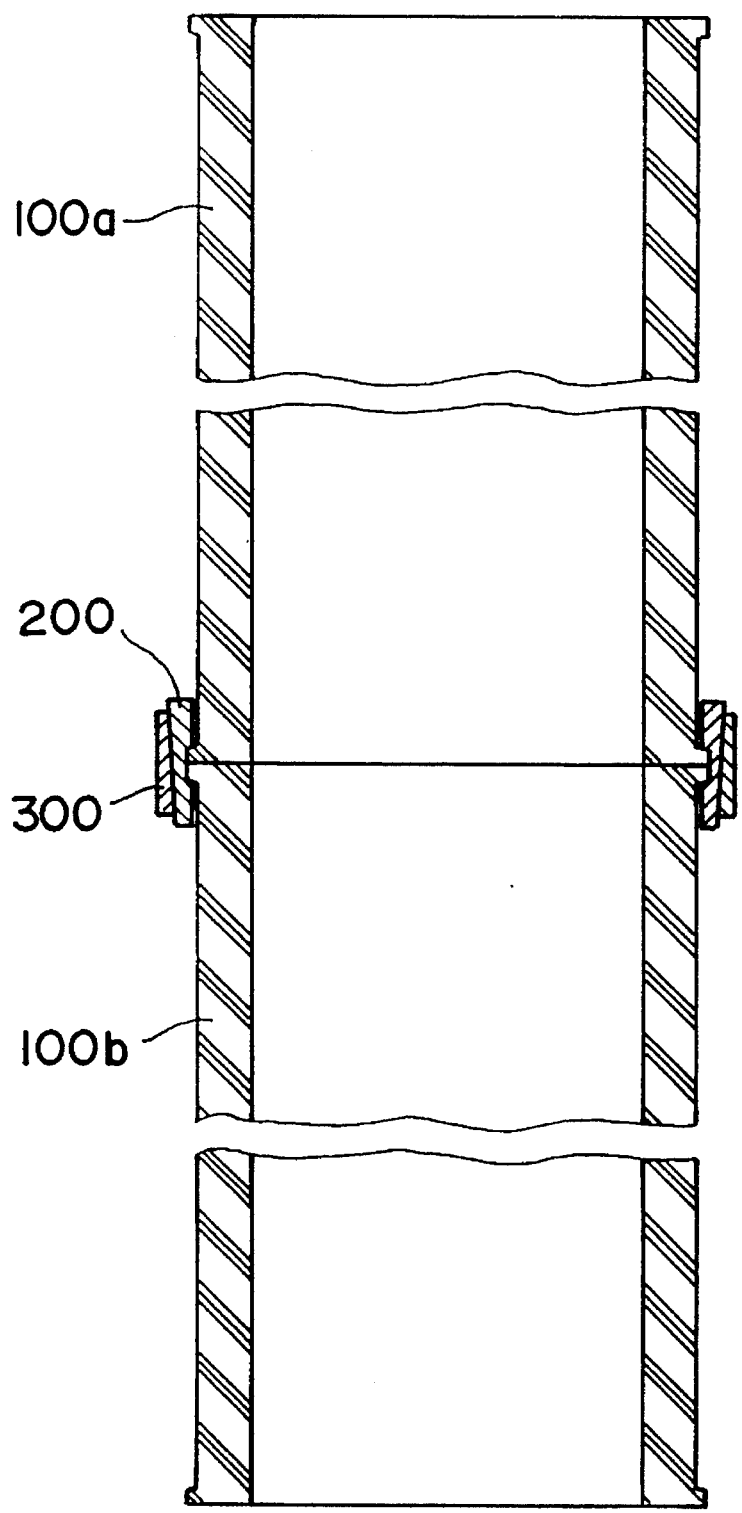
FIG. 8 is a vertical sectional view of a joint structure for pillars according to an embodiment of the present invention.

Next, the outside diameter of a pillar and the outside diameter of a joint portion will be described. FIG. 5 shows the joint structure wherein the outside diameter of the end plates 102*a* and 102*b* is smaller than the other outside diameter of the pillars 100*a* and 100*b*. The inside ring 200 and the outside ring 300, however, may be projected outward from the outside diameter surface of the pillars 100*a* and 100*b* as shown in FIG. 8.

The joint structure may be applied to upper and lower pillars 100*a* and 100*b* that are different, for example, for the case of the combination of a steel pipe pillar and a concrete pillar.

Figure 11:
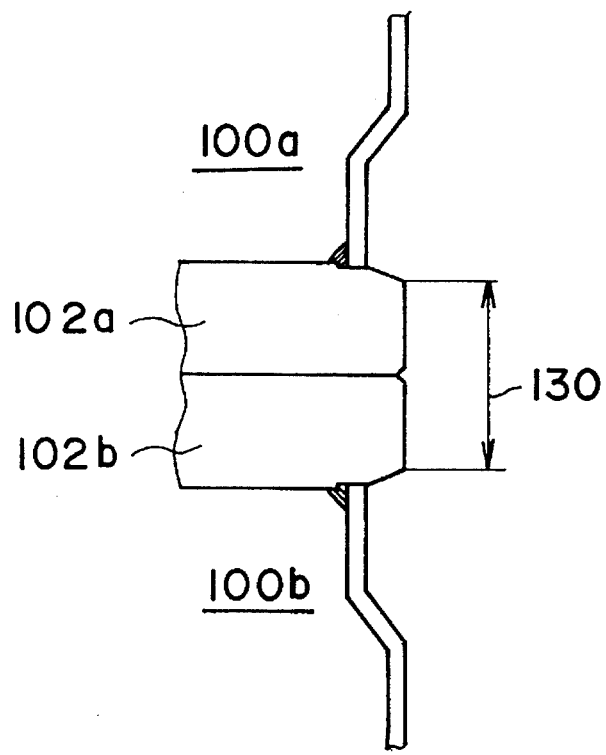
FIG. 11 shows a sectional profile of a joint end plate according to the present invention.
Figure 12:
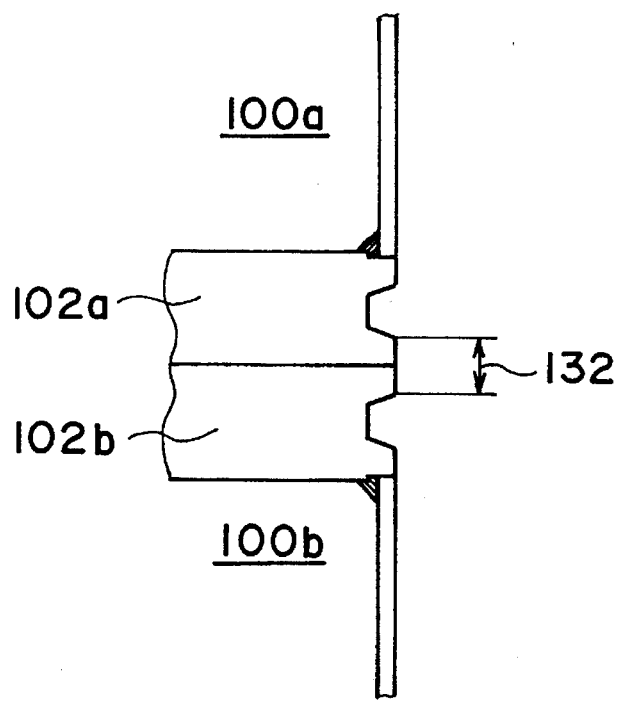
FIG. 12 shows a sectional profile of a joint end plate according to a comparative example.

FIGS. 11 and 12 comparatively show two arrangements. In FIG. 11, the outsides of the end plates 102*a* and 102*b* project beyond the ends of the pillars. In FIG. 12, recessed grooves are provided on each peripheral surface of the end plates 102*a* and 102*b*. For the same total thickness of the end plates 102 and 102*b*, as shown in FIG. 12, the thickness 132 between the grooves provided on the end plates is thinned, and the accuracy in the fitting between the circumferential projections provided on the inner surface of the inside ring and the grooves is low, so that the total thickness of the end plates 102*a* and 102*b* is not sufficiently utilized. On the contrary, in the example shown in FIG. 11, the thickness 130 near the total thickness of the end plates 102*a* and 102*b* is utilized at maximum, and the-joint portion, especially the end plates portions becomes very strong.

Next, the method of joining the pillars using the joint structure according to the present invention and the determination of the dimensions of the inside ring and the outside ring will be described.

According to the method of joining pillars using the joint structure of the present invention, the cylindrical inside ring 200 has a conical taper in the longitudinal direction of the pillar and the outside ring 300 has a conical taper externally fitted around the inside ring 200. The length of the conical taper of the inside ring is set to be longer than the length of the taper of the outside ring 300. Thus, the joining between the inside ring 200 and the outside ring 300 is performed by applying a specified thrust to the outside ring 300.

In this joining method, since the inside ring 200 is joined to the outside ring 300 with a specified applied thrust to the outside ring 300, it is possible to give a specified hoop tension to the outside ring 300. In this case, when the manufacturing errors are generated, the relative positions for fitting the inside ring 200 to the outside ring 300 varies. According to the present invention, the taper length of the inside ring 200 has a margin for absorbing these manufacturing errors.

In the basic joint structure of the present invention, the seats of the inside ring 200 to abut the truncated conical seats of the end plates are finished with high accuracy and are taken as the transmission surfaces for drawing and joining the pillars. The other surfaces on the pillar side are not allowed to be in contact with the inside ring 200 and are not required to be finished. With this arrangement, the joining portion of the pillars is simply machined and has a simple shape. Moreover, with this structure, the upper and lower pillar end surfaces are closely contacted with each other, so that there is no loss in transmitting the crimping force. The sectional shapes of the inside ring 200 and the outside ring 300 are formed by hotrolling, and therefore, the complicated machine finishing after rolling is not required at all.

Figure 13:
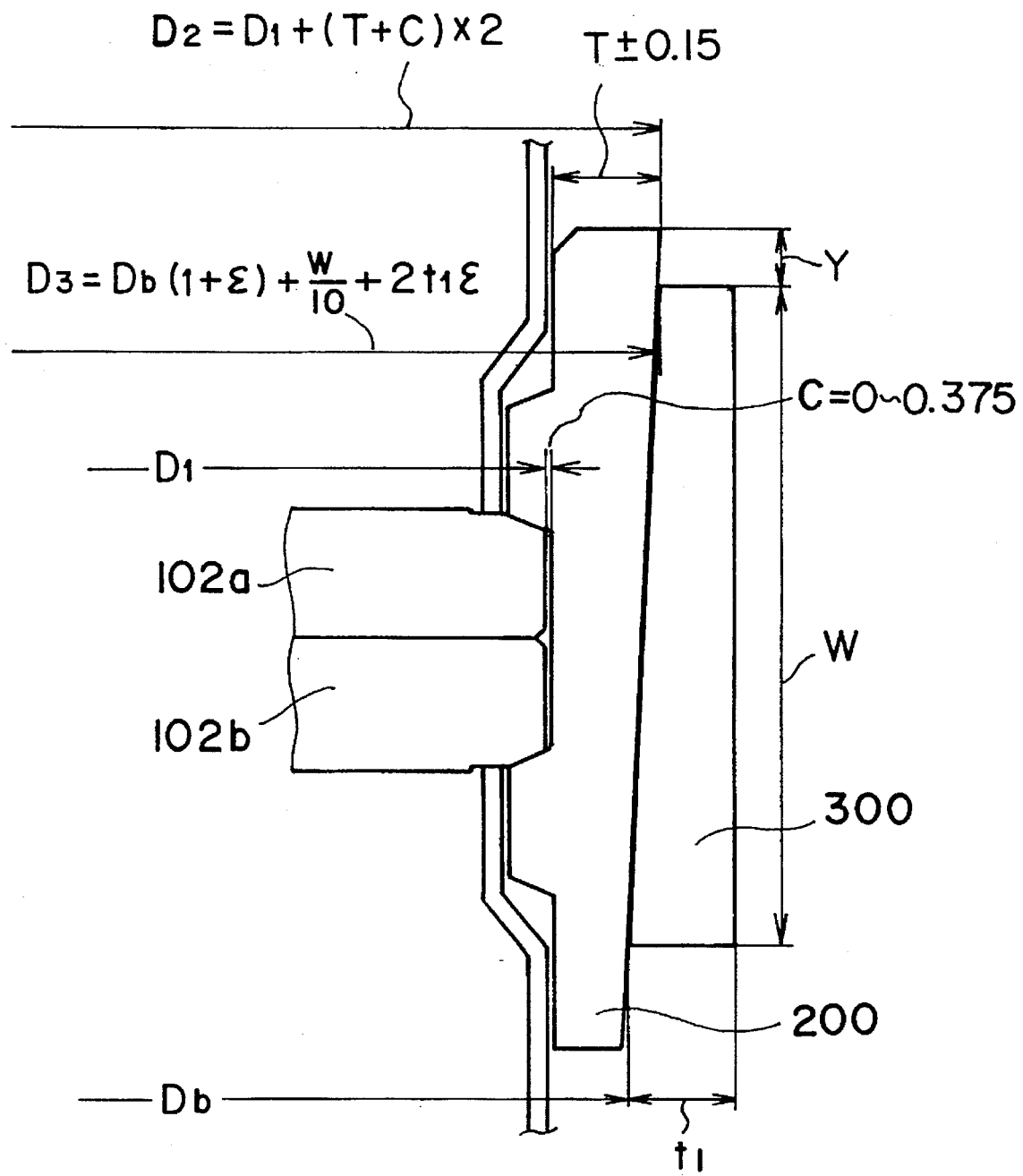
FIG. 13 is an explanatory view showing the relationship between the manufacturing allowance and the outside ring fitting position.

The determination of the dimensions of the inside ring and the outside ring will be described with reference to FIG. 13.

The width of the inside ring 200 in the longitudinal direction of the pillar is determined to be longer than the outside ring such that the lower end of the outside ring 300 is located upward from the lower end of the inside ring 200 when the outside ring 300 is externally fitted around the inside ring 200 with the axial thrust of the outside ring 300.

Of the manufacturing allowable errors for the end plates 102*a* and 102*b*, the inside ring 200, and the outside ring 300, the outside diameter $D_1$ of the end plate, the plate thickness T of the inside ring 200, and the clearance C of meshing portion between the outside diameter surface of the end plate and the inside diameter of the inside ring 200 are related to the fitting position of the outside ring 300. The sum of the above dimensions becomes the outside diameter $D_2$ of the inside ring 200.

The outside diameter $D_2$ of the inside ring 200 is maximized to be (specified value+1.2 mm) when $D_2$ is (specified value+ maximum allowable value), that is, $[D_1+(T+C)\times 2]$. The inside ring 200 is minimized to be (specified value −0.45 mm) when $D_1$ is (specified value—minimum allowable value), that is, $[D_1-T\times 2]$. Moreover, the inside diameter $D_2$ of the outside ring 300 after fitting is obtained by addition of the circumferential strain amount to the manufacturing dimension, and the upper surface difference Y is determined by subtracting the inside diameter $D_3$ of the outside ring 300 from the outside diameter $D_2$ of the inside ring 200. Namely, when the width of the outside ring 300 is W, the thickness is $T_1$ and the minimum inside diameter is $D_b$, the following equations can be obtained.

$$D_3 = D_b(1+\epsilon) + (W/10) + 2t_1\epsilon$$

$$Y = (D_2-D_3)\times(\tfrac{1}{2})\times(20/1)$$

The axial thrust (jacking pressure) of the outside ring 300 is determined for each diameter of the pillar, and the fastening force is determined such that the hoop tension with the circumferential strain being about 300μ ($300\times 10^{-6}$) is generated to satisfy the stresses for a long or short period for each case.

Figures 14, 15, 16:
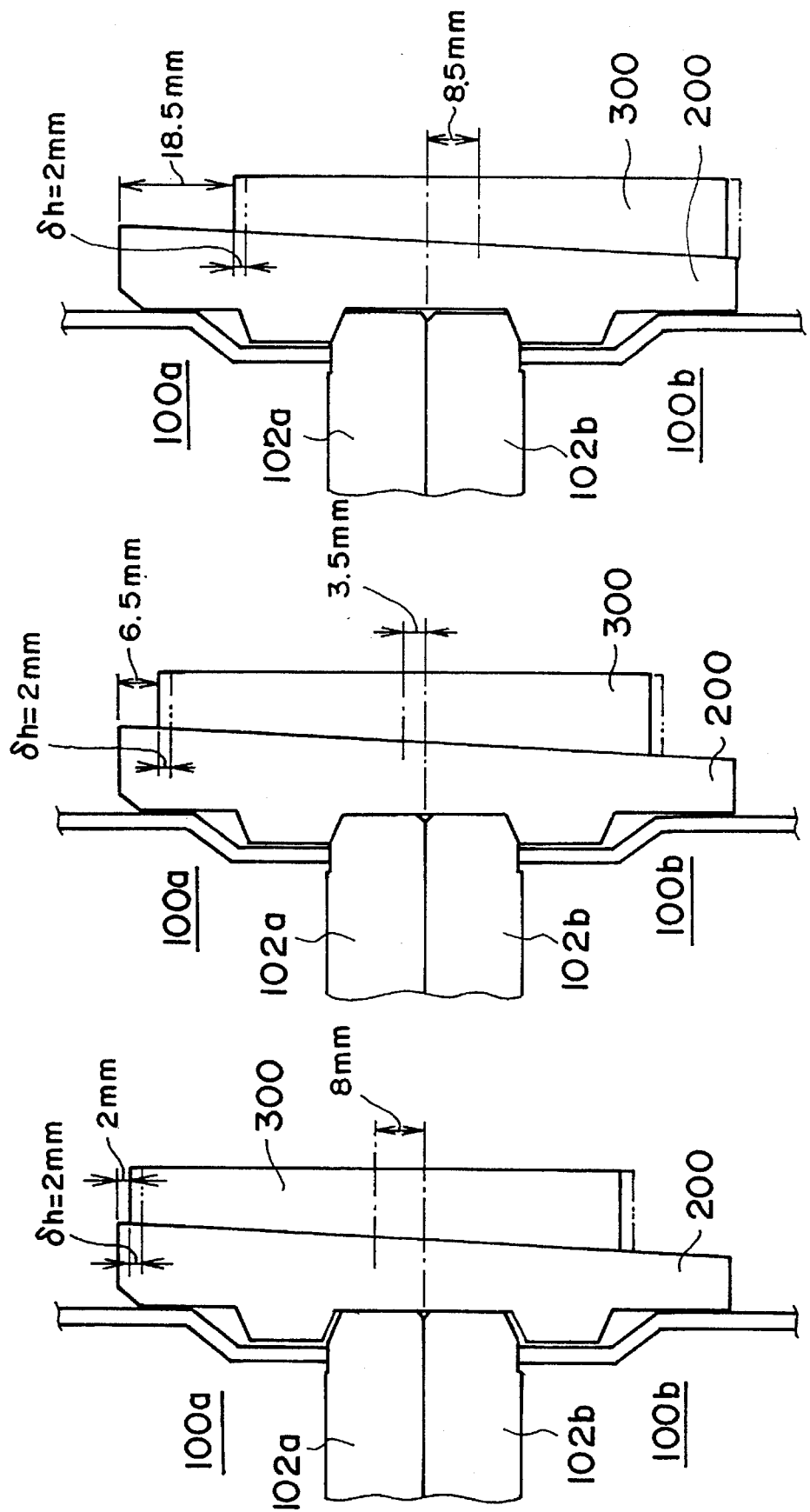
FIG. 14 is an explanatory view showing the relationship between the manufacturing allowance and the outside ring fitting position.
FIG. 15 is an explanatory view showing the relationship between the manufacturing allowance and the outside ring fitting position.
FIG. 16 is an explanatory view showing the relationship between the manufacturing allowance and the outside ring fitting position.

FIGS. 14 to 16 show the examples, wherein the cylindrical taper is 1120 and the manufacturing allowances of the end plates 102a and 102b and the inside ring 200 are in the range of ±1.2 mm to −0.45 mm, and further the outside diameter of the pillar is 600 mm. FIG. 14 shows an example where the end plate and the inside ring 200 are minimized, that is, the lower end diameter of the inside ring 200 is $D_b$=0.45 mm. In this case, the difference between the center positions of the inside ring 200 and the outside ring 300 in the longitudinal direction is 8 mm, wherein the difference between the positions before and after the outside ring 300 is fitted is δh=2 mm. FIG. 15 shows the example where the end plate and the inside ring have the standard dimensions, that is, the lower end diameter of the inside ring 200 is $D_b$=−0 mm. In this case, the difference between the center positions of the inside ring 200 and the outside ring 300 in the longitudinal direction is 3.5 mm, wherein the difference between the position before and after the outside ring 300 is fitted is δh=2 mm. FIG. 16 shows the example where the end plate and the inside ring 200 are maximized, that is, the lower end diameter of the inside ring 200 is $D_b$=+1.2 mm. In this case, the difference between the center positions of the inside ring 200 and the outside ring 300 in the longitudinal direction is −8.5 mm, wherein the difference between the positions before and after the outside ring 300 is fitted is δh=2 mm.

The axial allowance in the relative positions for the outside ring 300 and the inside ring 200 is ±8.5 mm. Accordingly, by setting the width of the inside ring 200 in the longitudinal direction of the pillar to be larger than that of the outside ring 300 by 20 mm, when the inside ring 200 is joined to the outside ring 300 with a specified axial thrust, the lower end of the outside ring 300 is located upward from the lower end of the inner end of the inside ring 200. Moreover, the upper end of the outside ring 300 is not protruded from the upper end of the inside ring 200. In addition, δh in FIGS. 14 to 16 shows the amount of positional change before and after the outside ring 300 is fitted.

In fitting the outside ring 300 around the inside ring 200 with the specified axial thrust, even in the case that the allowable errors in the manufacturing dimensions of the joint fitting metal are generated, the length of the conical taper of the inside ring 200 is lengthened such that the whole surface of the outside ring 300 abuts on the outer surface of the inside ring 200, thus accomplishing the joint with a stable hoop tension.

What is claimed is:

1. A joint structure for concrete foundation piles, comprising:

disk-like or ring-like end plates which are forcibly fixed on the end surfaces of said concrete foundation piles to be joined to each other, said end plates are provided with truncated conical seats around outer peripheral corner portions of said end plates on a counter-butted surface side;

a cylindrical inside ring divided in a plurality of parts along the circumference, which includes an inner surface having a circumferential recessed groove with an interval between side walls of said circumferential recessed groove being larger than the sum of the thicknesses of said end plates, and an outside diameter surface having a conical taper tilted in the axial direction of said concrete foundation piles, said inside ring being intended to be fitted around the outer periphery of said butted portion between said end plates;

an outside ring including an inner surface having a conical taper to be externally fitted around an outside diameter surface of said inside ring for fastening said inside ring;

a chloroprene rubber with attenuation interposed in clearances formed between said end plates and said side walls of said circumferential recessed groove; and the maximum outside diameter $D_2$ of the inside ring being a specified value plus 1.2 mm when $D_2=D_1+(T+C)\times 2$ and a minimum inside diameter of specified value minus 0.45 mm when $D_2=D_1-T\times 2$, where $D_1$ is the outside diameter of the end plate, T is the plate thickness of the inside ring and C is the clearance of a meshing portion.

2. A joint structure for concrete foundation piles according to claim 1, wherein an elastic material is one or more selected from a group consisting of natural rubber, synthetic rubber and easy-to-deform metal.

3. A joint structure for concrete foundation piles according to claim 1, wherein an elastic body is interposed between said end plates butted.

4. A joint structure for concrete foundation piles according to claim 3, wherein said elastic body comprises one or more of kinds of materials selected from a group consisting of natural rubber, synthetic rubber, plate spring, high pressure pneumatic or fluid spring, and easy-to-deform metal.

5. A joint structure for concrete foundation piles according to claim 3, wherein said elastic body is formed into planar, circular, rectangular or rhombic shape in the radial section.

6. A joint structure for concrete foundation piles according to claim 3, wherein the interval between said walls of said circumferential recessed groove is larger than the total sum of the thicknesses of said end plates, said elastic body interposed between said end plates, and said elastic materials which are located in clearances formed between said truncated conical seats of said end plates and said walls of said circumferential recessed groove.

7. A method of joining concrete foundation piles to each other, comprising the steps of:

joining a cylindrical inside ring divided into a plurality of parts in the circumferential direction and including an outer surface having a conical taper in the longitudinal direction of end plates of said concrete foundation piles, said inside ring being engaged with said concrete foundation piles, to an outside ring having a conical taper externally fitted around said inside ring;

wherein the length of said conical taper of said inside ring is longer than the length of the taper of said outside ring;

maximizing the outside diameter $D_2$ of the inside ring to be a specified value plus 1.2mm when $D_2 = D_1 + (T+C) \times 2$, where $D_1$ is the outside diameter of the end plate, T is the plate thickness of the inside ring and C is the clearance of a meshing portion;

minimizing the outside diameter of $D_2$ of the inside ring to be a specified value minus 0.45 mm when $D_2 = D_1 - T \times 2$; and adding an axial thrust that is determined for each diameter of the concrete foundation piles such that the hoop tension with the circumferential strain being about $300 \times 10^{-6}$ m.

* * * * *